United States Patent [19]
Morgan

[11] 3,859,157

[45] Jan. 7, 1975

[54] METHOD OF MAKING A SCORED PAPER LAMINATE

[75] Inventor: Burton D. Morgan, Hudson, Ohio

[73] Assignee: Morgan Adhesives Company, Stow, Ohio

[22] Filed: Aug. 8, 1972

[21] Appl. No.: 278,767

[30] Foreign Application Priority Data
Feb. 22, 1972  Canada............................... 135329

[52] U.S. Cl. ............................................... 156/268
[51] Int. Cl. ............................................. B32b 31/00
[58] Field of Search ...................... 156/250, 268–270

[56] References Cited
UNITED STATES PATENTS
3,719,548   3/1973   Keck et al........................... 156/268

*Primary Examiner*—Douglas J. Drummond
*Attorney, Agent, or Firm*—Oldham & Oldham Co.

[57] ABSTRACT

A scored paper laminate comprising a face sheet having an adhesive coating thereon and a removable paper backing. The scoring may be continuous and is in only the backing sheet to facilitate tearing the sheet at a later time to remove it and adopt the laminate for use as a label or similar product.

2 Claims, 9 Drawing Figures

PATENTED JAN 7 1975 3,859,157
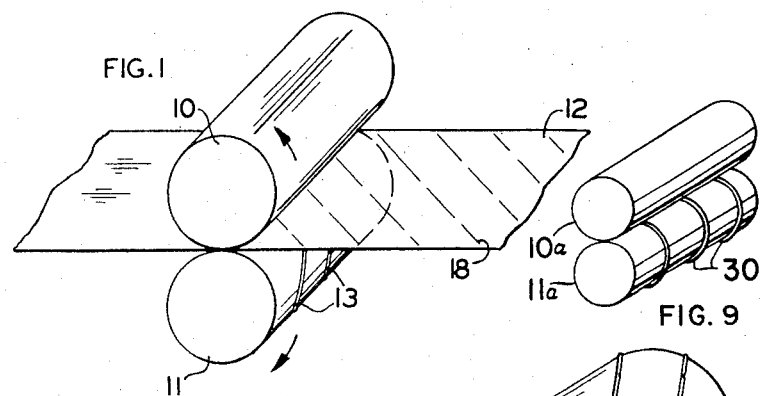
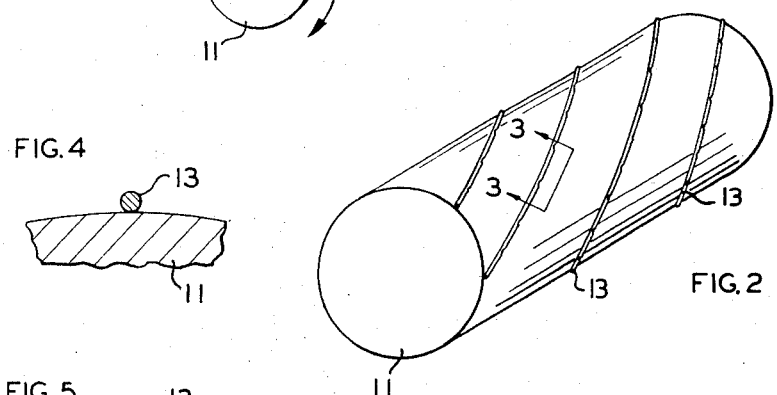
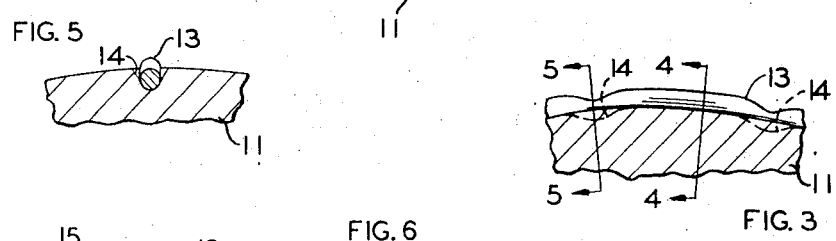
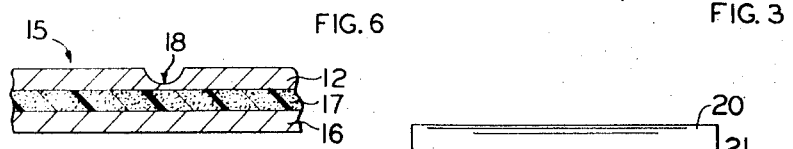
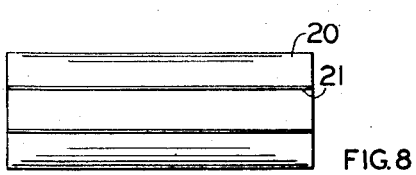
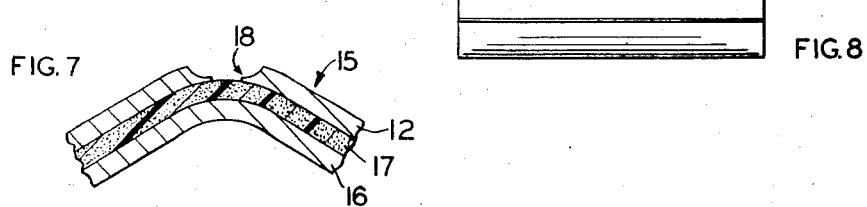

METHOD OF MAKING A SCORED PAPER LAMINATE

This invention relates to adhesive laminate products such as labels, stickers, tapes and similar articles wherein the article comprises, normally, a surface sheet, a layer of adhesive secured to the back face of such surface sheet, and a removable paper backing sheet secrured to the adhesive layer for ultimate removal when the label, sticker or the like is to be affixed to an article for end use purposes.

It is difficult to strip labels, stickers and the like of their backing sheets to prepare them for use because no available edge of the backing sheet usually is exposed to facilitate grasping the backing sheet for its removal. U.S. Patent No. 2,364,607 is on one adhesive tape or label of this same general type as made heretofore, but which label or laminate provided does not in many instances accept printing uniformly.

The general object of the invention is to form continuously scored sheets of material, especially paper backing sheets, that are used in forming adhesive laminates or the like and wherein the backing sheet of the laminate must be removed before use of the product.

A further object is to provide a novel scored laminate by improved means and by an easily practiced method.

The foregoing and other objects and advantages of the invention will be made apparent as the specification proceeds.

Reference now is made to the accompanying drawings in which:

FIG. 1 is a perspective view of apparatus which is diagrammatically shown and is used in forming a backing sheet for a laminate of the invention;

FIG. 2 is an enlarged elevation of one of the rolls of FIG. 1;

FIG. 3 is a fragmentary enlarged section taken on line 3—3 of FIG. 2;

FIG. 4 is a fragmentary enlarged vertical section taken on line 4—4 of FIG. 3;

FIG. 5 is a fragmentary enlarged vertical section taken on line 5—5 of FIG. 3;

FIG. 6 is a fragmentary enlarged section of an adhesive laminate made using a sheet processed by the apparatus of FIG. 1;

FIG. 7 shows the step of splitting the adhesive laminate of FIG. 6 along a weakened area provided in the backing sheet of the laminate;

FIG. 8 is an elevation of a modified roll of the apparatus; and

FIG. 9 is a perspective view of a modified pair of rolls for forming a scored backing sheet.

When referring to corresponding members shown in the drawings and referred to in the specification, corresponding numerals are used to facilitate comparison therebetween.

Attention now is directed to the details of the structure shown in the drawings, and a pair of rolls 10 and 11, which normally are cylindrical and are made from metal, are shown in operative association to form a roll bight therebetween. Normally, at least one of the rolls is driven whereby pressure engagement is provided at the roll bight for a sheet or strip of material 12 which will be drawn through the roll bight. Normally, in the process of use of the apparatus of the invention, the sheet or strip 12 would be formed from a fibrous material, such as paper, of the type that conventionally is used for forming backing sheets in adhesive laminates.

Adhesive laminates using the sheets 12 may be used for making stickers, labels or other articles therefrom. Normally the sheets 12 are quite thin such as in the range of from about 0.001 inch to about 0.005 inch in thickness. The sheet has a conventional release coating (not shown) thereon on the face thereof to be adjacent the adhesive layer 17 referred to hereinafter. Such face preferably would be the top surface of the paper as shown in FIG. 1.

It is a feature of the present invention that the roll 11 has one or more metal wires, or ribs 13 secured to or formed on the surface thereof. When wires 13 are used preferably they would be made from spring steel and, for example, would have a diameter of approximately 0.010 inch but the wire thickness can be varied dependent upon the thickness of the sheets 12 being processed and the desired amount of scoring to be provided thereon. The wire or wires 13 can be secured to the periphery of the roll 11 in any desired manner, as by spot welding or otherwise securing at least the ends of the wire 13 to the metal roll 11. However, if desired, the wire 11 could be affixed to the roll by a suitable adhesive, such as a conventional epoxy type of an adhesive which will set up at room temperature or at slightly elevated temperatures to give a good bond of the wire 13 to the roll. The wires are helically positioned on the roll 11.

It is another portion of the present invention that parts of the wires 13, at longitudinally spaced sections of the wire may have complementary shaped recesses 14 formed in the surface of the roll 11 for receiving a length of the wire 13 when the rolls 10 and 11 operatively engage whereby the wire 13 will not form a continuous scored or weakened area, zone or line in the sheet 12 being processed. But a continuous scored line can be obtained if the recesses 14 are omitted. With recesses provided, spaced portions of the sheet 12 would not be effected because the wire 13 would have sufficient resilience or stretch, and would have no backing provided therefor at the longitudinally spaced portions of the wires lying over the recesses 14, so that such portions of the wire will just be pushed into the recesses 14 when the rolls engage. This particular construction of the wires and rolls leaves sufficient strength in the sheet 12 whereby it can be readily further processed without any danger of splitting or tearing while being processed or prepared for use. At the same time, the recesses 14 would only be provided at, for example, intervals of 1 to 4 inches along the periphery of the roll 11, and such recesses 14 necessarily could be quite short, such as approximately one-fourth to one-half inch or so.

By passing the sheet 12 through the roll bight, the fibrous material forming the sheet 12 will be crushed or weakened in lineal zone or lines 18 of the sheet where the wire or rib 13 contacts it and where the wire is backed up by the surface of the roll 11.

FIG. 3 shows how a plurality of the small recesses 14 could be formed in the periphery of the roll for receiving longitudinally spaced portions of the wire 13 therein when the roll 11 is operative. FIG. 5 in turn indicates how this wire can be received in the recess for passing portions of the sheet 12 through the roll bight without any scoring action on spaced areas of the sheet 12.

After the sheet 12 has been processed by being fed through the roll bight between the rolls 10 and 11, then it can be thereafter treated in any conventional manner. However, before the crushing, a layer of a release material of a conventional nature, such as a silicone base composition, has been applied to one surface of the sheet 12. In applying the release coating, the paper sheet 12 is heated to dry the conventional silicone coating applied thereto and this, of course, also dries the paper. Next, the paper is exposed to humid air to rehumidify the paper and stabilize it at about 50 percent relative humidity. Hence, the paper will not pick up or release any appreciable amount of water when exposed to the atmosphere especially if it is controlled to be in the vicinity of 50 percent relative humidity.

By the crushing action exerted on the paper layer 12 by the rolls 10 and 11 or equivalent means used, compressed, rigidified lines or areas 18 are formed in the paper. The paper is compressed to about one-quarter to one-half of it original thickness in the areas 18 and this compaction of the fibers in the paper stiffens and rigidifies the paper to make it brittle in the areas 18 so that bending the layer 12 as in FIG. 7 readily will produce a tearing of the paper on the tear line 18. The paper has sufficient water content that it will not absorb any more or enough additional water as to expand the fibers of the paper 12 back to any size approaching an uncompressed condition in the lines or areas 18.

After forming the brittle lines or areas 18 in the paper 12, a laminate 15 can be made in a conventional manner and which laminate could, for example, include a surface layer 16, a layer of a conventional adhesive composition 17 attached to the layer 16, and then the release coated surface of the sheet 12 would be releasably affixed to the opposite face of the adhesive layer 17. Any desired pressure sensitive or other adhesives can be used in forming the laminate 15 and such adhesives may, for example, be of the compositions described on Page 586 of "Handbook of Adhesives" by Skeist.

After the laminate 15 has been fully prepared for use as by printing any desired data thereon after the laminate is made, or before the components thereof are assembled, as desired, then the laminate 15 can be cut to a desired shape, or otherwise be prepared for use. When the laminate is to be used, it is a relatively simple matter to fold or bend the laminate 15 in a direction as shown in FIG. 7 so as to tension the weakened zone or line 18 provided on the sheet 12 whereby such backing paper will split or tear along this line 18, the sheet 12 or a portion thereof is removed, and the adhesive layer 17 can be exposed for securing the end product to a carrier surface for use. Thus, it is believed that the objects of the invention have been achieved and that a new and improved apparatus has been provided for scoring or weakening ultimate tear lines or zones in sheet material, such as paper and the like, and a new laminate is provided.

In some instances, it may be desirable to use a roll such as a roll 20 shown in FIG. 8 rather than the roll 11 in combination with the roll 10 for forming weakened zones, areas or lines in a processed sheet of material. The roll 20 has ribs or wires 21 formed thereon or secured thereto. In this instance, however, the wires 21 extend axially of the roll 20 inasmuch as the sheet material processed between the rolls 20 and 21 will still have sufficient strength for processing and handling even though spaced score lines or zones are provided in sheets of material processed between the rolls.

FIG. 9 shows a pair of rolls 10a and 11a for forming continuous scored lines in the paper sheet. Ribs or wires 30 are present on the roll and are parallel to each other and perpendicular to the longitudinal axis of the roll. Hence, continuous scored or compacted lines will be formed on the fibrous sheet passing through the bight formed between the rolls. The ribs or wires can be of any suitable size to score, compress or crush the paper to weaken and/or embrittle it in localized tear lines that leaves the paper being processed as a continuous sheet.

Obviously the wires 30 and/or the wires 21 can be spaced as desired. Any size of paper can be processed but continuous score lines can be formed extending the width or length of the paper processed. Thus, the end laminate can have a label formed therefrom with one or more score lines formed in the backing layer of paper on each label. One of the scoring rolls is adjustably positioned to adjust the scoring pressure on different papers.

As indicated in the drawings, the scored areas or lines 18 have had the paper compacted to less than 50 percent of its original thickness. It also should be noted that the compacted surface of the layer 12 is the outer surface of the layer in the laminate to facilitate bending the sheet 12 on itself to tear such layer or sheet.

What is claimed is:

1. A method of making a laminate for use in making a label or the like from a paper fibrous material layer, including the steps of applying a liquid release coating to one surface of the paper layer and drying it thereon, stabilizing the release coated paper layer at about 50 percent relative humidity, thereafter forming a plurality of weakened reduced thickness continuous score lines in the other surface of the paper layer by mechanically crushing or compacting the fibers in the paper at the scored line to less than 50 percent of the original thickness of the paper, and laminating a layer of adhesive and a face sheet to said paper layer with said adhesive layer being intermediate the paper layer and said sheet and being bonded to said one surface of said paper layer.

2. A method of making a laminate for use in making a label or the like, comprising applying a liquid release coating to one surface of a paper fibrous material layer and drying it thereon, exposing the dried coated paper layer to humid air and stabilizing it at about 50 percent relative humidity, forming a plurality of weakened reduced thickness continuous score lines in the other surface of the paper layer by mechanically crushing or compacting the fibers at the scored line to about 25 50 percent of the original thickness of the paper, and laminating a layer of adhesive and a face sheet to said paper layer with said adhesive layer being intermediate the paper layer and said sheet and bonded to the one surface of said paper layer.

* * * * *

UNITED STATES PATENT OFFICE
CERTIFICATE OF CORRECTION

Patent No. 3,859,157　　　　　　　　　　Dated　January 7, 1975

Inventor(s)　Burton D. Morgan

It is certified that error appears in the above-identified patent and that said Letters Patent are hereby corrected as shown below:

Column 4, line 56, after "25", insert -- to --.

Signed and sealed this 19th day of March 1975.

(SEAL)
Attest:

RUTH C. MASON
Attesting Officer

C. MARSHALL DANN
Commissioner of Patents
and Trademarks